United States Patent [19]

Boilsen

[11] 4,208,949
[45] Jun. 24, 1980

[54] MISSILE CARRIER AIRPLANE

[75] Inventor: Kenneth R. Boilsen, Woodinville, Wash.

[73] Assignee: Boeing Commercial Airplane Company, Seattle, Wash.

[21] Appl. No.: 902,476

[22] Filed: May 3, 1978

[51] Int. Cl.$^2$ ............................................. F41F 3/06
[52] U.S. Cl. .................................. 89/1.801; 89/1.815
[58] Field of Search ................ 89/1.815, 1.816, 1.804, 89/1.803, 1.801, 1.8, 1.818

[56] References Cited

U.S. PATENT DOCUMENTS

| | | | |
|---|---|---|---|
| 2,731,885 | 1/1956 | Nolan | 89/1.815 |
| 2,826,120 | 3/1958 | Lang et al. | 89/1.803 |
| 2,900,874 | 8/1959 | Tjossem | 89/1.815 |
| 4,040,334 | 8/1977 | Smethers | 89/1.818 X |
| 4,106,389 | 8/1978 | Walley | 89/1.816 X |

*Primary Examiner*—David H. Brown
*Attorney, Agent, or Firm*—H. Gus Hartmann; Bernard A. Donahue

[57] ABSTRACT

An air launched cruise missile carrier airplane having a floor mounted track system for moving missile racks into a launch position adjacent to a side opening in the fuselage and ejecting missiles therethrough, then moving the empty missile racks from the launch location and repositioning a full rack of missiles thereat. A continuous missile launching sequence is provided by the floor track system which guides the movement of the missile racks within a cargo compartment of the fuselage for a continuous carousel movement.

11 Claims, 8 Drawing Figures

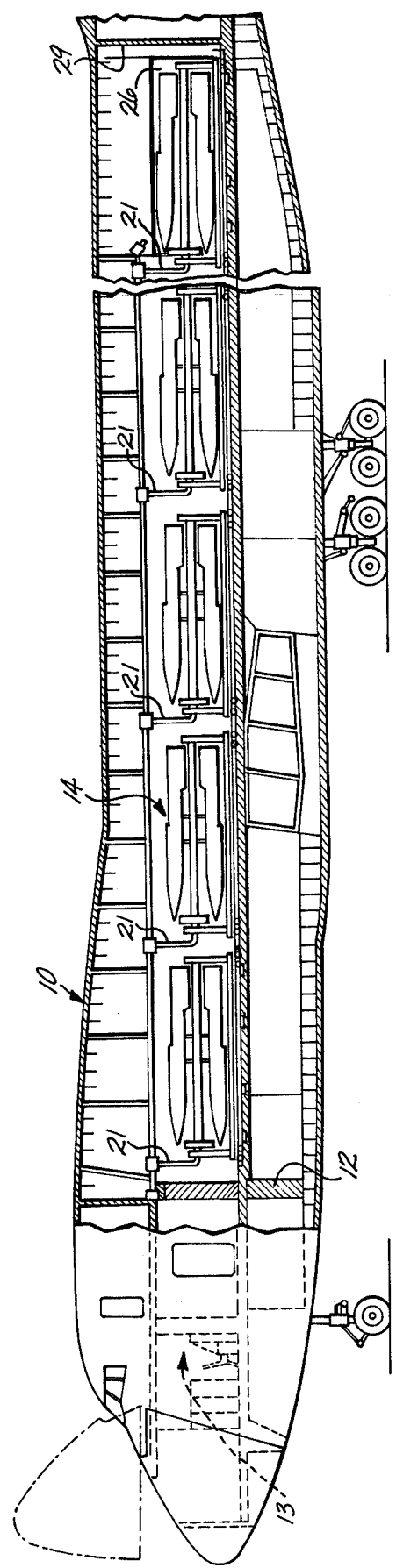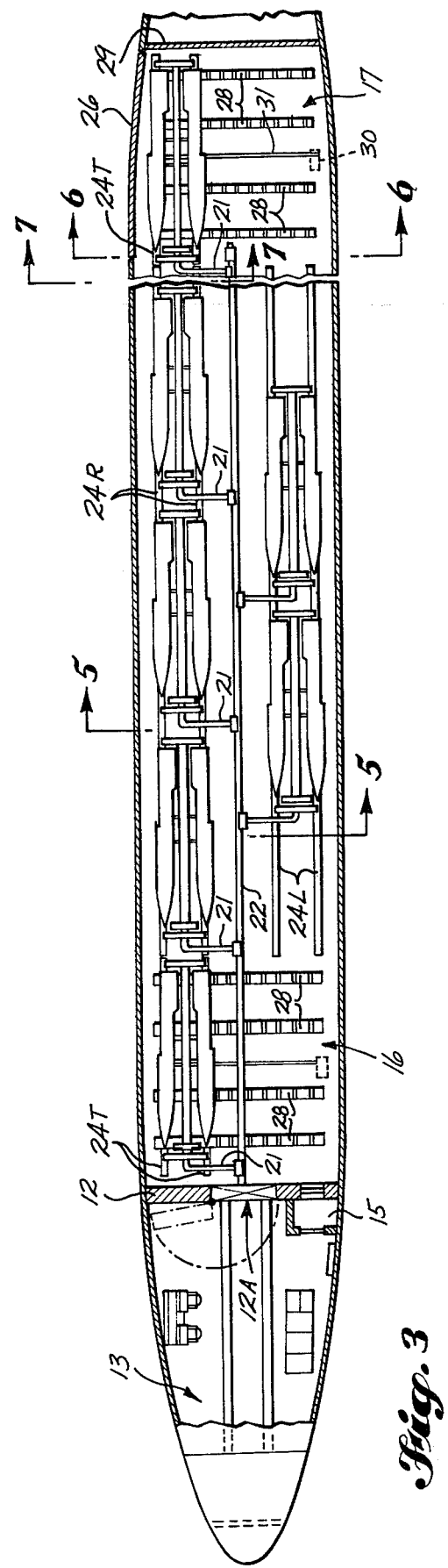

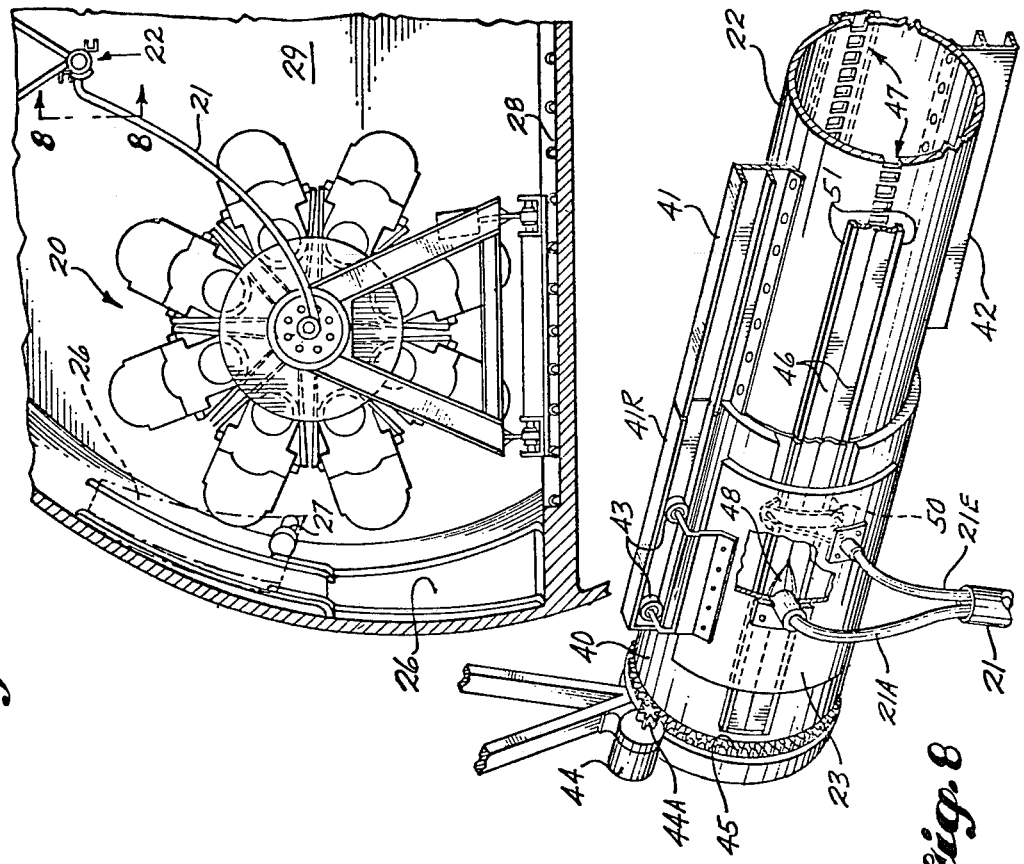
Fig. 7
Fig. 8
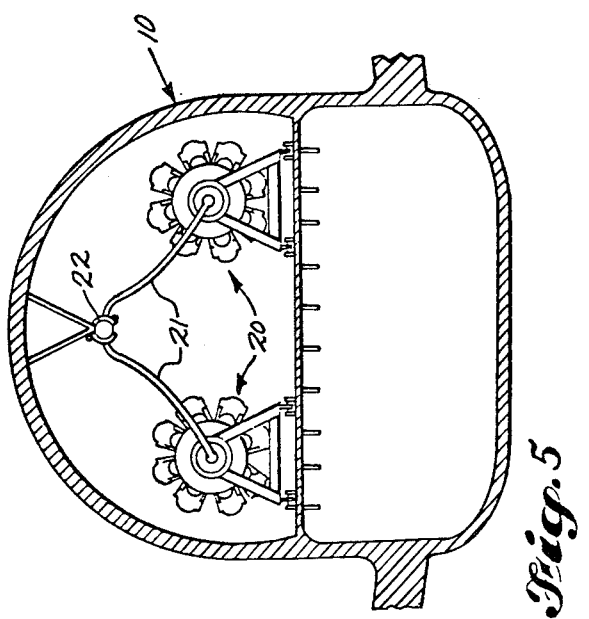
Fig. 5
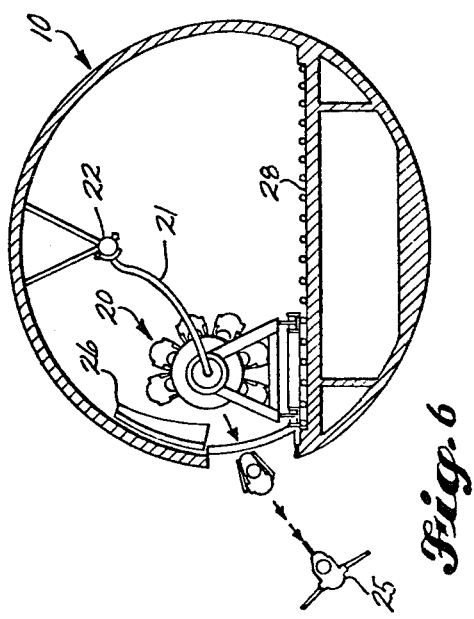
Fig. 6

MISSILE CARRIER AIRPLANE

SUMMARY OF THE INVENTION

The invention relates to an air launched cruise missile handling and deployment system for a wide-body type of airplane, such as the Boeing 747, the McDonnell Douglass DC-10, and the Lockhead L-1011, which have the built-in large payload capability for carrying internally a large number of missiles. The present invention provides the capability of converting present known wide-body type of military or commercial passenger and freighter airplanes, to use as missile carriers and launching platforms, with a minimum amount of structural modification and weight penalty being absorbed by the carrier aircraft.

The missiles are carried on rotary racks which are transferred longitudinally along either side of the wide-body fuselage on longitudinally parallel tracks and at both ends of the fuselage a rotary rack is transferred laterally across to the tracks on either side, such that the missile racks move in a continuous carousel on the deck of the missile compartment.

When a rotary rack is in position adjacent a launch door opening in the aft side of the fuselage, a missile is ejected from the rotary rack through said opening in an outward and downward direction through the downwash from the wing and to avoid the empennage surfaces. When the rack of missiles is emptied, it is moved laterally across the fuselage to the tracks on the other side and another fully loaded missile rack is moved into the launch position.

Electrical power and conditioned air are supplied to each rotary rack through an individual unbilical cord connected in sliding relation to an overhead supply duct. The umbilical cord comprises an electric cable and air duct, having a quick-disconnect plug at the missile attachment connection; and serves to connect a source of conditioned air and electrical power to the equipment inside the missile for control and test purposes, while the missile is still in its launching rack or operatively dependent upon the mother plane.

An object of the invention is to develop a cruise missile carrier from the present known wide-body type of jet aircraft, such as the Boeing 747, the McDonnell Douglass DC-10, and the Lockhead L-1011, which would offer an increased payload capability over current missile carrying military airplanes and yet not pose a high cost factor or severe weight penalty so that the airplane's performance capability can be retained.

Another object is to keep the configuration of the wide-body type airplane as basic as possible, by reducing the amount of major structural changes and thus reducing cost and weight penalty to the airplane.

BRIEF DESCRIPTION OF THE DRAWINGS

FIG. 2 is a side view of a Boeing 747 type airplane incorporating the cruise missile handling and deployment system of the present invention.

FIG. 3 is a plan view of FIG. 2 and shows the two longitudinal rows of rotary missile racks and the fore and aft lateral transfer terminal areas for providing a carousel movement thereof.

FIG. 5 is a rear cross-sectional view taken in the staggered direction 5—5 indicated on FIG. 3 and shows the two rows of missile loaded rotary racks across the compartment.

FIG. 6 is a rear cross-sectional view taken in the direction 6—6 indicated on FIG. 3 and shows a missile loaded rotary rack at the aft launch door position with a missile being ejected downward and outward through the side opening.

FIG. 7 is an enlarged detailed rear cross-sectional view taken in the direction 7 indicated on FIG. 3 and shows approximately half of the fuselage cross-section with a missile loaded rotary rack at the aft launch door position.

FIG. 8 is an enlarged perspective view of a rotating sleeve which is connected to the overhead central duct at the lateral transfer terminal locations at either end of the missile compartment.

DESCRIPTION OF THE PREFERRED EMBODIMENTS

Figure 1:
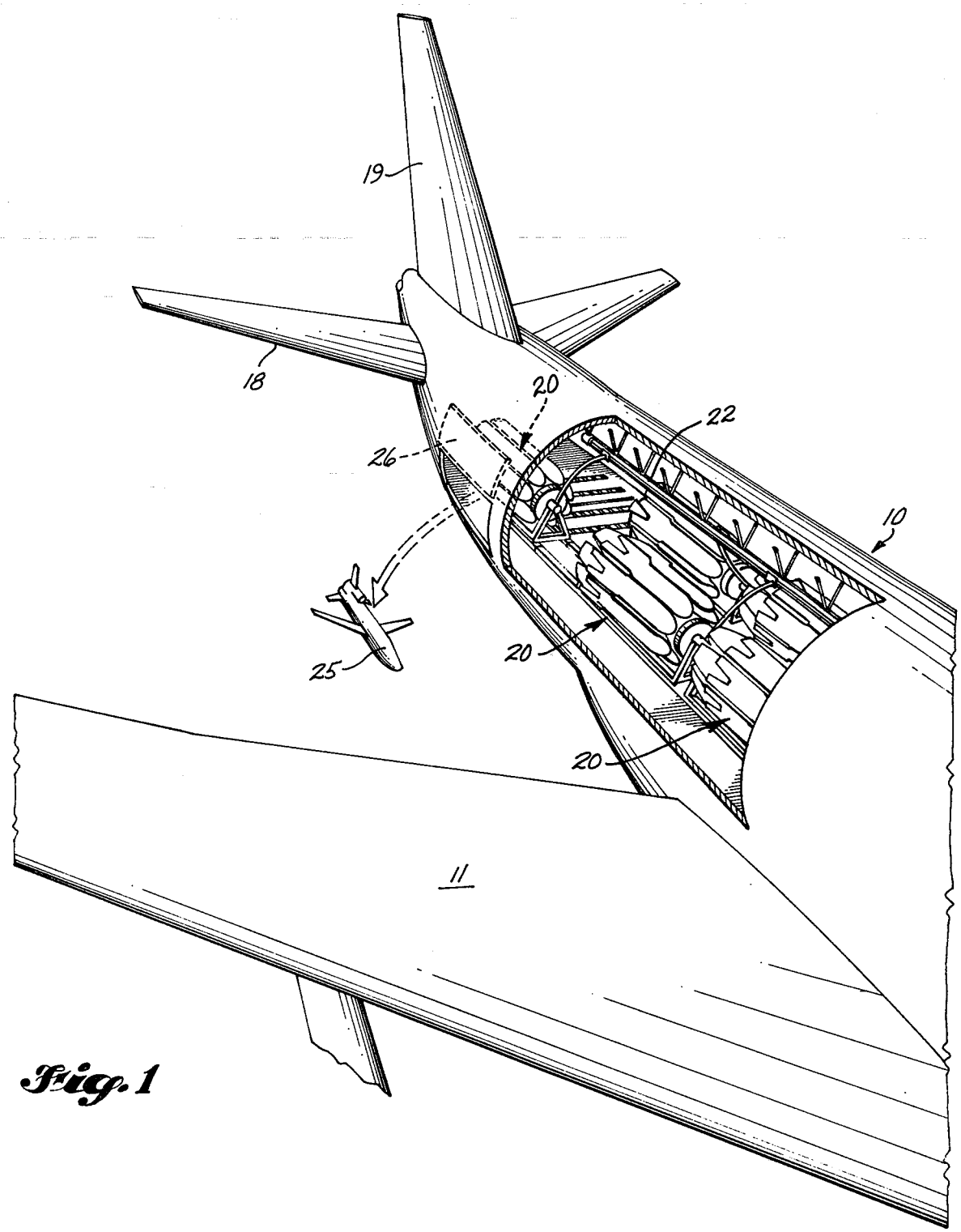
FIG. 1 is a perspective view of a missile carrier airplane provided with a side opening for air launch of cruise missiles and depicts a missile from an internally carried rotary rack, being ejected outward and downward through the downwash from the wing.

FIGS. 1, 2, and 3 show a perspective view, a side view and a plan view, respectively, of a wide-body airplane similar to a Boeing 747 freighter, incorporating the cruise missile handling and deployment system of the present invention.

For this type of airplane, it is easier to load a missile loaded rotary rack 20 straight in through the nose section of the fuselage 10, than through the standard side cargo loading door (not shown), which may be too short in length for a rotary rack 20 to be loaded crosswise to the opening.

By loading a full rotary rack of missiles at one time, makes it much easier for ground check-out of the missiles instead of having to load and check-out each missile individually as they are installed aboard the airplane.

At the forward end of the fuselage 10 is a pressure bulkhead 12 which separates a pressurized crew compartment 13, forward thereof, from the unpressurized missile compartment 14 and allows the crew to function in a pressurized atmosphere which makes their work load easier if they are not wearing pressure suits or oxygen masks. Centrally of the pressure bulkhead 12 is a doorway 12A through which a fully loaded rotary rack of missiles is transferred from the nose door cargo area into the unpressurized missile compartment 14 and deployed along two adjacent longitudinal pairs of parallel tracks 24. Also incorporated with the pressure bulkhead 12 is an air lock chamber 15 for allowing personnel movement between the pressurized crew's compartment 13 and the unpressurized missile compartment 14.

Within the missile compartment, at the fore and aft ends thereof, is a lateral transfer terminal 16 forward and 17 aft, for moving a rotary rack 20 between the two substantially stationary adjacent longitudinal pairs of parallel tracks 24L (left), 24R (right), so as to produce a carousel movement of the missile racks within the compartment. For the operation of a continuous rotary rack transfer system, it is necessary that one vacant position for a rotary rack be allowed in order to permit an empty rack to be moved into that position, and a missile loaded rotary rack to be moved into the launch position. With the launch door 26 at the aft right side of the compartment, as shown, the vacant position would probably be maintained on the left-hand side of the airplane, at the aft end of the fixed longitudinal track section for the clockwise rotation of the racks as shown.

Down the center of the missile compartment is an overhead supply duct 22 which provides conditioned air and electrical power to each missile loaded rotary rack through a flexible umbilical cord 21. The umbilical cord 21 is connected at its upper end through a sliding shoe fitting 23, as shown in FIG. 8, with the overhead supply duct 22 and at its lower end through a fitting connection to the rotary rack.

A missile launch door 26 is shown on the aft right-hand side of the fuselage; however, it could conceivably be one either side, or there could be two launch doors, one on each side of the fuselage for decreasing missile launch time and increasing reliability at some additional weight penalty for the additional door. One of the determining factors in the location of the launch door is the aerodynamic interference of the missile during its launch sequence and before it has aerodynamically stabilized itself on course in powered flight.

Referring to FIG. 1, with respect to the Boeing 747 type of aircraft, the launch door should be located aft of the wing 11 so that the missile 25 will be ejected down through the wing downwash and also to avoid the horizontal stabilizer 18 and vertical fin 19 in the empennage section. There would be disadvantages to ejecting the missile 25 forward of the wing 11 because of the proximity to the engine (not shown) and the airflow going up over the wing.

Figure 4:
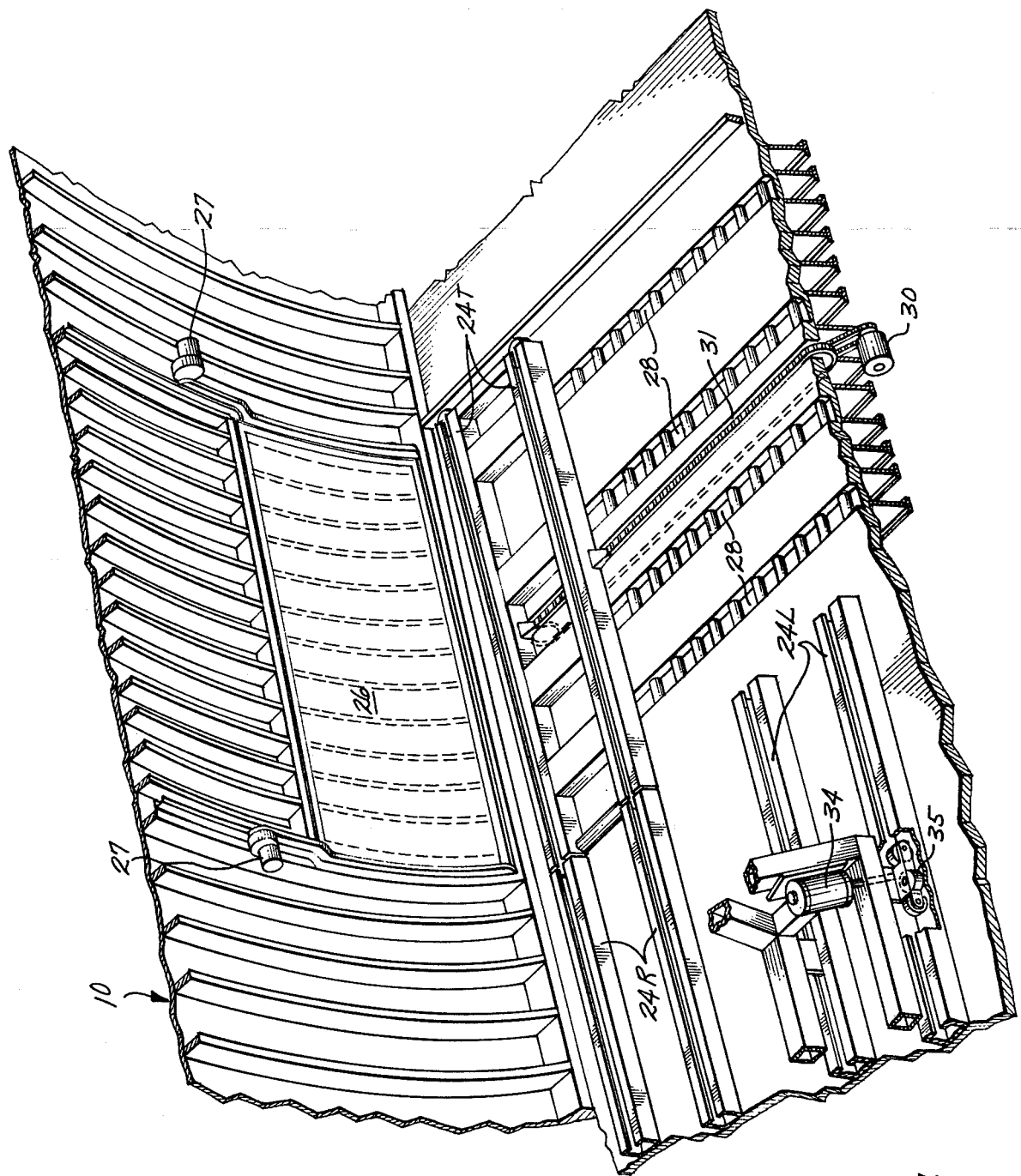
FIG. 4 is a rear perspective view of the right rear area of the fuselage showing the aft lateral transfer system and the launch door.

FIG. 4 is an isometric view of the right-rear area of the missile compartment showing in enlarged detail the floor mounted lateral transfer terminal system and the plug type missile launch door 26 in the right side of the fuselage. In the lateral transfer area, a section of the dual-rail track 24T is moved transversely across the compartment by a drive motor 30 and cable 31 arrangement installed in the floor. This lateral transfer track 24T is shown aligned with the substantially stationary pair of dual tracks 24R on the right-hand side of the compartment and, as depicted, is in position for receiving a missile loaded rotary rack into the launch location adjacent to the launch door opening.

FIGS. 6 and 7 are views looking aft of the fuselage, taken in the direction 6—6 and 7—7 indicated in FIG. 3 and shows a missile loaded rotary rack at the launch position adjacent the launch door 26 shown in FIG. 4.

Referring to FIGS. 4, 6 and 7, the door 26 and its opening through which the missiles are launched, is actuated by two drive motors 27; one on either side of the door opening, which are attached to body frame structure. The initial door opening motion is to bring the upper edge of the door in and then raise the door up along the inner mold line of the body frames. This door opening operation, i.e., bringing the door inside the fuselage, eliminates the additional aerodynamic drag associated with an outward opening type door, since there is some drag associated with the opening itself due to the airflow circulation into and around the opening into the fuselage. The results from wind tunnel tests with this type of door in the open position do not indicate a severe amount of buffeting.

Because the missile compartment is unpressurized, it allows the construction of the missile launch door 26 and door frame structure to be lighter in weight than a more complicated pressure carrying type door. Since the door is quite long, if it had to carry pressure it would be much heavier and more complicated than it is; but, since it is unpressurized, it can be of skin stiffener type of construction. Also, because it is lighter, the hinging, latching and actuation mechanism can be designed to lower design load requirements.

FIG. 8 is an isometric view of the overhead supply duct taken in the general direction 8—8 indicated in FIG. 7.

The umbilical management problem of the missile loaded rotary racks is solved by the single main overhead supply duct 22 housing both conditioned air flow and electrical power required by the missiles prior to launching. The supply duct runs down the centerline of the fuselage and is supported from the overhead structure thereof. Each missile loaded rotary rack is connected to this overhead supply duct through a sliding shoe fitting 23.

The overhead supply duct 22 has an upper channel track 41 and a lower channel track 42, which are fixedly connected thereto and run the overall length of the duct.

The flexible umbilical cord 21 from each missile rack is connected to the overhead supply duct through the sliding shoe plate 23 which is designed to allow it to move along one of said tracks 41, 42 when it is on one side of the fuselage, and the other of said tracks when it is on the opposite side of the fuselage; thereby, permitting the flexible umbilical cords from missile racks on opposites sides of the fuselage to pass one another without interference.

As shown in FIG. 8, the sliding shoe plate 23 is connected through rollers to the upper channel track 41 of the overhead supply duct 22.

A split seal 46 of rubber or other suitable material runs along the length of the overhead duct and covers a perforated or vented screen 47 which comprises a lengthwise seam in the wall of the duct. A splitter member 48 is connected to the shoe plate on the side adjacent to the duct and functions to spread apart the split seal 46 for tapping-off conditioned air flow into the air umbilical cord 21A and for controlling the atmosphere around electronic components in the missile.

In addition to an air umbilical cord 21A, each missile loaded rotary rack has an electrical umbilical cord 21E connected to the sliding shoe plate 23. Through a sliding clamp 50 contact with a pair of hot rails 51 on either side of the split seal 46 on the wall of the duct, electrical power is tapped-off from the supply duct to each of the rotary racks.

Electricity is utilized for powering the drive motor 34, shown in FIG. 4, attached to the base or carriage of the rotary rack and for moving the rack along the dual-track system and into the launch location.

Referring to FIGS. 4 and 7, attached to the base structure or carriage of each rotary rack is a drive motor 34 which rotates a cog wheel 35 that engages a geared track incorporated within the two adjacent longitudinal pairs of parallel tracks 24R and 24L for individual movement of the racks along said parallel tracks.

Electricity is also utilized for rotating the missile rack and for powering the electronic system of the missile until it is air launched and on its own.

FIGS. 1 and 6 show a missile 25 being ejected from a rotary rack, through the launch door opening in an outward and downward direction, so as to clear the horizontal stabilizer 18 and to be thrown through the wing downwash flow, prior to self-propelled flight of the missile. After all of the missiles are ejected from the rotary rack, the empty rack is moved to the left-side of the fuselage by means of the floor mounted lateral transfer system shown in the detailed perspective view of FIG. 4.

At either end of the missile compartment is the lateral transfer terminal area and mounted on the overhead supply duct 22 is a rotatable sleeve member 40 shown in FIG. 8. When a rotary rack is positioned onto the dual-rail lateral transfer track 24T on the floor of the compartment, the sliding shoe plate 23 for said rack will be connected through rollers 43 to the overhead track section 41 of the rotating sleeve member 40.

During lateral transfer of the rotary rack from one set of dual-rail tracks 24R to the other 24L, the sliding shoe plate 23 at the upper end of the flexible umbilical cord 21 will rotate with the sleeve member 40; and when the dual-rail of the transfer track 24T is aligned with the dual-rail track 24L on the left side of the fuselage, the channel track section 41R of the rotating sleeve member 40 will align itself to a 180° return position with the lower track 42 on the opposite side of the overhead duct and the roller guided shoe plate 23 with its associate missile rack will be allowed to move forward in the compartment. Said shoe plate 23 will then slide along the left side of the overhead duct centerline and slide past those shoe plates that are on the right side of the overhead duct centerline.

The 180° rotation of the sleeve member 40 and locking it into position, so that the sliding shoe 23 and its support guide rollers 43 will pick-up the lower stationary track 42 on the overhead duct, may be accomplished by movement of the umbilical cord 21 as it follows the lateral movement of the rotary rack to which it is attached. However, it may be more reliable, and certainly more positive, if a small motor 44 having a cog gear 44A engaging a ring gear 45 attached to the sleeve 40 were utilized for rotating the sleeve member 40 to the desired position; and means provided so that the rotation of the sleeve member is simultaneous with lateral transfer of the rotary rack.

Index pins or stops (not shown) are incorporated into the rotary connection, in order that the sleeve member 40 at either end of the overhead supply duct will only be able to rotate until its track 41R has re-aligned itself with the opposite or lower track 42 on the supply duct, and then it will be stopped so that the empty rotary rack can be moved forward and out of the lateral transfer area; and then the sleeve member 40 will be rotated back to pick up the next loaded missile rack.

In the preferred embodiment shown and described, the handling system for carousel movement and positioning of the missile loaded rotary racks within the fuselage of an airplane is considered as a separate cargo handling system from that of the conventional cargo handling system existing in the aircraft; e.g., in the Boeing 747-F, freighter airplane. Depending upon the extent of modification required to the aircraft, the existing cargo handling system mounted within the floor structure of such freighter airplanes could be removed and the longitudinal pairs of tracks of the missile handling system could be directly attached to floor beam structure.

What is claimed is:

1. A missile carrier aircraft having an internal missile cargo compartment running along a substantial length of the fuselage, comprising: a track system having a pair of adjacent dual-rail tracks stationarily mounted to the floor of said compartment and running approximately the longitudinal length thereof; said track system having a lateral transfer track terminal at either end of said compartment; said lateral transfer track terminal comprising a section of dual-rail track for shuttling transversely across said compartment and alternately aligning up with either of said stationarily mounted tracks; a rotary rack adapted to receive a plurality of elongated missiles which are disposed annularly about the rotary axis of said rack; said rotary rack having a support carriage and means mounted on the base of said carriage for operatively engaging a set of said dual-rail tracks for movement therealong; a supply duct mounted centrally overhead, down the longitudinal length of said compartment for housing both conditioned air flow and electrical power; and an umbilical cord interconnecting said rotary rack through a slide fitting engagement with said supply duct for continuous tapping-off of conditioned air and electrical power during movement of said rotary rack along the floor mounted track system.

2. The missile carrier aircraft as set forth in claim 1, further including: a sleeve member located in the fore and aft lateral transfer track terminal areas and mounted for rotation about said overhead supply duct, for transfer of said umbilical cord from one side of said duct to the other, during movement of said rotary rack laterally across the compartment from one set of dual-rail stationary tracks to the other set.

3. The missile carrier aircraft as set forth in claim 1, further including: a pair of channel tracks being spaced apart and fixedly attached at opposite sides to said overhead supply duct and running parallel approximately the overall length of said duct; said slide fitting engagement of said umbilical cord with said supply duct comprising a sliding shoe plate supportably connected to said duct through either of said channel tracks depending upon the side of said compartment that its connected rotary rack is on.

4. The missile carrier aircraft as set forth in claim 1, further including: a perforated seam forming a lengthwise section in the wall of said overhead supply duct; a split seal for covering said lengthwise perforated seam to sealably contain the conditioned air flow in said duct; and seal splitter means attached to said slide fitting, which connects said umbilical cord to said supply duct, for spreading apart said split seal and tapping-off conditioned air flow into the air umbilical cord to control the environment within the missiles.

5. The missile carrier aircraft as set forth in claim 1, further including: a missile launch door located on the aft side of said compartment adjacent to said aft lateral transfer track terminal; means for moving said door inwardly and upwardly along the inner hull of the fuselage, from a closed position to an open position, to form an opening in the side of said compartment for ejection of missiles therethrough.

6. A missile carrier aircraft, comprising: a compartment internally along a substantial length of the fuselage of said aircraft for storage of missile cargo; a track system having a parallel pair of spaced apart dual-rail tracks running approximately the longitudinal length of said compartment and stationarily connected to the floor thereof; said track system also having a lateral transfer track terminal at either end of said compartment; said lateral transfer track terminal comprising a section of dual-rail track for shuttling transversely across said compartment and alternately aligning up with either of said stationarily mounted dual-rail tracks;

a rotary rack adapted to receive a plurality of elongated missiles disposed annularly about the rotary rack axis; said rotary rack having a support carriage; means mounted on a base of said support carriage for operatively engaging a set of said dual-rail tracks for movement therealong; said track system providing for a carousel type movement of said rotary rack about the floor of said compartment; a supply duct mounted centrally overhead, down the longitudinal length of said compartment for housing both conditioned air flow and electrical power; a pair of channel tracks being spaced apart and fixedly attached to opposite sides of said overhead supply duct and running parallel approximately the overall length of said duct; a sliding shoe plate supportably connected by said channel tracks to said overhead supply duct; an umbilical cord interconnecting said rotary rack with said supply duct through said sliding shoe plate; and said sliding shoe plate being adapted to move along on either side of said overhead supply duct depending upon the side of said compartment that its connected rotary rack is on, to allow said umbilical cord to continuously tap-off conditioned air and electrical power for said rotary rack and to allow said rotary rack to pass another rotary rack on the opposite side of said compartment during movement of said rotary rack along the floor mounted track system.

7. The missile carrier aircraft as set forth in claim 6, further including: a sleeve member located in the fore and aft lateral transfer track terminal areas and mounted for rotation about said overhead supply duct, for transfer of said umbilical cord from one side of said duct to the other, during movement of said rotary rack laterally across the compartment from one set of dual-rail stationary tracks to the other set.

8. The missile carrier aircraft as set forth in claim 6, further including: a perforated seam forming a lengthwise section in the wall of said overhead supply duct; a split seal for covering said lengthwise perforated seam to sealably contain the conditioned air flow in said duct; and seal splitter means attached to said sliding shoe plate, on the side adjacent to said split seal, for spreading apart said split seal and tapping-off conditioned air flow into the air umbilical cord to control the environment within the missiles.

9. The missile carrier aircraft as set forth in claim 6, further including: a missile launch door located on the aft side of said compartment adjacent to said aft lateral transfer track terminal; means for moving said door inwardly and upwardly along the inner hull of the fuselage, from a closed position to an open position, to form an opening in the side of said compartment for ejection of missiles therethrough.

10. A missile carrier aircraft, comprising: a compartment internally along a substantial length of the fuselage of said aircraft for storage of missile cargo; a track system having a parallel pair of spaced apart dual-rail tracks extending approximately the longitudinal length of said compartment and stationary to the floor thereof; said track system also having a lateral transfer terminal at either end of said compartment; said lateral transfer terminal comprising a section of dual-rail track for shuttling transversely across said compartment and alternately aligning up with either of said stationarily mounted dual-rail tracks; a rotary rack adapted to receive a plurality of elongated missiles disposed annularly about the rotary rack axis; said rotary rack having a support carriage; means mounted on a base of said support carriage for operatively engaging a set of said dual-rail tracks for movement therealong; said track system providing for a carousel type movement of said rotary rack about the floor of said compartment; a missile launch door located in the side of said compartment at the aft portion thereof; means for moving said door inwardly and upwardly along the inner hull of the fuselage, from a closed position to an open position, to form an opening in the side of said compartment for ejection of missiles therethrough; a supply duct mounted centrally overhead, down the longitudinal length of said compartment for housing both conditioned air flow and electrical power; a pair of channel tracks being spaced apart and fixedly attached to opposite sides of said overhead supply duct and running parallel approximately the overall length of said duct; a sliding shoe plate supportably connected by said channel tracks to said overhead supply duct; an umbilical cord interconnecting said rotary rack with said supply duct through said sliding shoe plate; a sleeve member located at each of the fore and aft lateral transfer terminals and mounted for rotation about said overhead supply duct for transfer of said umbilical cord from one side of said supply duct to the other side during movement of said rotary rack, in one of said lateral transfer terminals, from one set of stationarily mounted dual-rail floor tracks on one side of said compartment, to the other set of dual-rail stationary track at the other side of said compartment, said sliding shoe plate being adapted to move along on either side of said overhead supply duct depending upon the side of said compartment that its connected rotary rack is on, to allow said umbilical cord to continuously tap-off conditioned air and electrical power for said rotary rack and to allow said rotary rack to pass another rotary rack on the opposite side of said compartment during movement of said rotary rack along the floor mounted track system.

11. The missile carrier aircraft as set forth in claim 10, further including: a perforated seam forming a lengthwise section in the wall of said overhead supply duct; a split seal for covering said lengthwise perforated seam to sealably contain the conditioned air flow in said duct; and seal splitter means attached to said sliding shoe plate on the side adjacent to said split seal for spreading apart said split seal and tapping-off conditioned air flow into the air umbilical cord to control the environment within the missiles.

* * * * *